United States Patent
Faatz et al.

(10) Patent No.: US 8,674,039 B2
(45) Date of Patent: Mar. 18, 2014

(54) CROSSLINKABLE POLYMER POWDER COMPOSITION WHICH IS REDISPERSIBLE IN WATER

(75) Inventors: Michael Faatz, Burghausen (DE); Reinhard Haerzschel, Burghausen (DE)

(73) Assignee: Wacker Chemie AG, Munich (DE)

( * ) Notice: Subject to any disclaimer, the term of this patent is extended or adjusted under 35 U.S.C. 154(b) by 197 days.

(21) Appl. No.: 12/695,807

(22) Filed: Jan. 28, 2010

(65) Prior Publication Data

US 2010/0197831 A1 Aug. 5, 2010

Related U.S. Application Data

(60) Provisional application No. 61/149,053, filed on Feb. 2, 2009.

(51) Int. Cl.
| | |
|---|---|
| C08F 212/08 | (2006.01) |
| C08F 220/18 | (2006.01) |
| C08L 25/14 | (2006.01) |
| C08L 33/08 | (2006.01) |
| C08L 33/10 | (2006.01) |
| C08L 63/00 | (2006.01) |
| C08L 63/02 | (2006.01) |

(52) U.S. Cl.
USPC ........... 525/529; 525/108; 525/113; 525/116; 525/119; 525/120; 525/121; 525/122; 525/510; 525/511; 525/531

(58) Field of Classification Search
None
See application file for complete search history.

(56) References Cited

U.S. PATENT DOCUMENTS

| | | | |
|---|---|---|---|
| 3,652,723 A | 3/1972 | Fellers et al. | |
| 3,822,229 A | 7/1974 | McMaster | |
| 4,013,615 A * | 3/1977 | Ohashi et al. | 523/205 |
| 4,020,040 A * | 4/1977 | Kattoh et al. | 524/512 |
| 4,028,294 A | 6/1977 | Brown et al. | |
| 4,108,819 A | 8/1978 | Oyamada et al. | |
| 4,379,872 A * | 4/1983 | Ishikura et al. | 523/406 |
| 4,690,988 A | 9/1987 | Hoffman et al. | |
| 5,049,631 A * | 9/1991 | Amano et al. | 526/204 |
| 6,197,863 B1 | 3/2001 | Eck et al. | |
| 6,235,811 B1 | 5/2001 | Robeson et al. | |
| 6,534,177 B2 | 3/2003 | Kohlhammer et al. | |
| 6,566,434 B1 * | 5/2003 | Mayer et al. | 524/425 |
| 2001/0024644 A1 | 9/2001 | Kohlhammer | |
| 2008/0098933 A1 | 5/2008 | Killat | |

FOREIGN PATENT DOCUMENTS

| | | |
|---|---|---|
| CN | 100999612 A | 7/2007 |
| CN | 101168577 A | 4/2008 |
| DE | 2601200 | 7/1976 |
| DE | 3229657 A1 | 2/1984 |
| DE | 3308622 A1 | 9/1984 |
| DE | 10004319 | 8/2001 |
| DE | 10004319 A1 | 8/2001 |
| EP | 0721004 | 7/1996 |
| EP | 0723975 | 7/1996 |
| EP | 0896029 | 2/1999 |
| EP | 1170341 A2 | 1/2002 |
| GB | 1505787 | 3/1978 |
| JP | 2008-248101 A * | 10/2008 |

OTHER PUBLICATIONS

Fox, T. G.; #J5—"Influence of Diluent and of Copolymer Composition on the Glass Temperature of a Polymer System"; Bulletin American Physics Society; vol. 1; 1956; p. 123 (1 p).

Lee, W. A. & Rutherford, R. A.; "The Glass Transition Temperatures of Polymers"; Polymer Handbook, $2^{nd}$ Edition; 1975; 53 pp.; J. Wiley & Sons, New York.

Friederich, Pierre, International Search Report, Oct. 26, 2010, 2 pgs.

* cited by examiner

*Primary Examiner* — Robert Sellers
(74) *Attorney, Agent, or Firm* — RatnerPrestia

(57) ABSTRACT

The invention relates to a crosslinkable polymer powder composition redispersible in water, obtainable by means of free radical polymerization, in an aqueous medium, of one or more monomers from the group consisting of vinyl esters of straight-chain or branched alkylcarboxylic acids having 1 to 15 C atoms, methacrylates and acrylates of alcohols having 1 to 15 C atoms, vinylaromatics, olefins, dienes and vinyl halides, no epoxide-functional comonomers being copolymerized, and subsequent drying of the polymer dispersion obtained thereby, wherein, before and/or during the polymerization and/or before the drying of the polymer dispersion obtained thereby, an epoxy resin is added and, if appropriate after the drying, a curing agent crosslinking with the epoxy resin is added.

31 Claims, No Drawings

CROSSLINKABLE POLYMER POWDER COMPOSITION WHICH IS REDISPERSIBLE IN WATER

CROSS REFERENCE TO RELATED APPLICATIONS

This application claims priority of Provisional Application Ser. No. 61/149,053, filed Feb. 2, 2009, the entirely of which is incorporated herein by reference.

FIELD OF THE INVENTION

The invention relates to a crosslinkable polymer powder composition redispersible in water, processes for the preparation thereof and the use thereof.

BACKGROUND OF THE INVENTION

Polymer powders redispersible in water—(re)dispersion powders—are obtained by drying the corresponding aqueous polymer dispersions in the presence of a drying aid (in general a protective colloid). Owing to the proportion of protective colloid, firstly irreversible sticking together of the polymer particles is prevented during the drying process since the polymer particles are surrounded by the water-soluble protective colloid particles. Secondly, this protective colloid matrix, which dissolves again on dispersing of the polymer powder in water, ensures that the polymer particles are present again with the particle size of the starting dispersion in the aqueous dispersion.

Such dispersion powders are used in all kinds of applications, for example in coating materials, in adhesives for a very wide range of substrates. Most widespread is the use thereof in construction chemistry products, frequently in combination with hydraulic binders. Examples of these are construction adhesives, in particular tile adhesives, renders and mortar materials, paints and filling compounds, leveling compounds, composite heat insulation systems and joint mortar. The advantage of the dispersion powders lies in particular in the possibility of using them in prepared, storable dry mixes, optionally together with hydraulic binders, such as cement, and making them ready for use only immediately before use by addition of water. Such dry mixes can be more easily transported than pasty systems (without a proportion of water) and have advantages during storage.

The use of dispersion powders serves in particular for improving the mechanical strength and the adhesion of mortar materials modified therewith on film formation of the polymer particles. It is known that polymer films can be crosslinked for further improvement of the mechanical strength.

U.S. Pat. No. 4,028,294 discloses the preparation of crosslinkable polymer latices by using an epoxy resin as a mixture with monomer in the emulsion polymerization. Moreover, to obtain a crosslinkable system, polymerization is also effected in the presence of epoxy-reactive comonomers which carry groups crosslinking with the epoxy resin. It is alleged that no premature crosslinking occurs at the temperatures chosen for the polymerization. The preparation of polymer powder compositions redispersible in water is not described. U.S. Pat. No. 4,108,819 describes the copolymerization of vinyl acetate and ethylene in the presence of an epoxy resin. For preventing premature crosslinking, the pH is kept at pH 3 to pH 7 during the polymerization. An amino curing agent is then added to the prepared dispersion. A disadvantage in the case of these processes is the danger of premature crosslinking since both epoxide groups and amino curing agent are present in the aqueous dispersion and therefore at least partly crosslink during storage. The preparation of polymer powder compositions redispersible in water is not described. In U.S. Pat. No. 6,235,811 B1, aqueous dispersions of epoxy-modified vinyl acetate (co)polymers are prepared by a procedure in which a vinyl acetate (co)polymer latex is mixed with the liquid epoxy resin or an aqueous solution of the epoxy resin, and liquid isophoronediamine is then added. Here too, epoxy resin and amine crosslinking agent are present side by side in the liquid phase, which leads to premature crosslinking on prolonged storage. DE 2601200 describes an aqueous vinyl acetate-ethylene copolymer dispersion which was obtained by polymerization in the presence of an epoxy resin and to which an amine crosslinking agent is added. Since the reactive components are present side by side in the aqueous phase, such systems tend to premature crosslinking. In U.S. Pat. No. 4,690,988, polymer-modified, vinylized epoxy resins are obtained by first reacting a polyepoxide with an ethylenically unsaturated carboxylic acid and polymerizing further monomers (vinyl-functional chain-extending monomers) in the presence of the vinylized epoxy resin. The crosslinking of the polymers obtained thereby is effected by addition of (hydro)peroxides. Premature crosslinking is difficult to rule out in the case of such systems.

A crosslinkable dispersion powder is obtained, according to US 2001/0024644 A1, by copolymerization of ethylenically unsaturated monomers and epoxide-functional monomers in an aqueous medium, drying of the dispersion and subsequent addition of polyepoxide. A disadvantage is that the crosslinking efficiency here is relatively low. EP 0896029 A1 describes a process in which ethylenically unsaturated monomers are copolymerized with comonomers which contain crosslinkable groups, the dispersion is dried and solid particles which carry functional groups which can crosslink with the crosslinkable groups of the copolymer are then admixed. EP-A 723975 A1 discloses a dispersion powder which is obtained by copolymerization of styrene and/or (meth)acrylates with epoxide-functional comonomers. A disadvantage in the case of these processes is the danger of premature crosslinking during polymerization in the presence of crosslinkable comonomers. EP 721004 A2 discloses polymer powder compositions which contain polymer powder and pulverulent, crosslinking components, which are obtained by applying the respective liquids to a pulverulent carrier. The pulverulent components are then mixed with one another. A disadvantage there is the handling of such a 3-component system and the poor redispersibility of such mixtures.

SUMMARY OF THE INVENTION

It was therefore the object to provide a polymer composition which leads to water-resistant films in particular when used in construction chemistry products, even without addition of mineral binders, and during the preparation and storage of which premature crosslinking is effectively prevented.

DETAILED DESCRIPTION OF THE INVENTION

The invention relates to a crosslinkable polymer powder composition redispersible in water, obtainable by means of free radical polymerization, in an aqueous medium, of one or more monomers from the group consisting of vinyl esters of straight-chain or branched alkylcarboxylic acids having 1 to 15 C atoms, methacrylates and acrylates of alcohols having 1 to 15 C atoms, vinylaromatics, olefins, dienes and vinyl halides, no epoxide-functional comonomers being copolymerized, and subsequent drying of the polymer dispersion obtained thereby, wherein, before and/or during the polymerization and/or before the drying of the polymer dispersion obtained thereby, an epoxy resin is added and, if appropriate after the drying, a curing agent crosslinking with the epoxy resin is added.

Epoxy resin is to be understood as meaning epoxide compounds which are not capable of free radical polymerization and have at least two epoxide groups per molecule. The epoxide compounds may be of an aliphatic, araliphatic or aromatic nature, for example epoxide compounds of the bisphenol A type, i.e. condensates of bisphenol A and epichlorohydrin or methylepichlorohydrin. Epoxy resins based on bisphenol F, which generally contain a mixture of bisglycidyloxyphenylmethanes, are also suitable. Further examples are aliphatic epoxide compounds, such as glycidyl ethers of aliphatic polyols, in particular butyldiglycidyl ether; cycloaliphatic epoxy resins, such as vinylcyclohexane dioxide, dicyclopentadiene dioxide and 3,4-epoxy-6-methylcyclohexylmethyl; and heterocyclic epoxide compounds, such as triglycidyl isocyanurate. Such epoxy resins are commercially available, for example bisphenol A and bisphenol F types as Epilox® resins.

The epoxy resins of the bisphenol A type and bisphenol F type are preferred. The epoxy resins are used in an amount of from 1 to 50% by weight, preferably from 5 to 30% by weight, based in each case on the total weight of the monomers used for the polymerization.

Suitable curing agents crosslinking with the epoxy resin are those which crosslink with the epoxy resin at the processing temperature of construction chemistry products, as a rule ambient temperature, in general at temperatures from 0° C. to 40° C. Amines crosslinking with the epoxy resin are preferred. Particularly preferred amines are those having two or more amino groups, for example aliphatic polyamines, polyoxyalkyleneamines, polyethyleneimines, aminosilanes and condensates thereof, aminofunctional polyvinyl alcohols. Most preferred are aliphatic polyamines, which are obtainable under the trade name Anquamine® or Epilink® or Epilox® curing agent, or polyoxyalkyleneamines, which are available under the trade name Jeffamine®, or polyethyleneimines, which are obtainable under the trade name Polyimin. Most preferred are also aminosilanes and condensates thereof. Suitable aminosilanes are, for example, those obtainable under the trade name Geniosil®, such as N-(2-aminoethyl)(3-aminopropyl)trimethoxysilane (Geniosil GF 91), (3-aminopropyl)triethoxysilane (Geniosil GF 93), N-(2-aminoethyl)(3-aminopropyl)methyldimethoxysilane (Geniosil GF 95).

The crosslinking curing agents can be added as a liquid to the polymer powder composition modified with epoxy resin and redispersible in water; preferably the crosslinking curing agents are applied as powder. If the curing agents are present as liquid under standard conditions (DIN 50014 23/50), the curing agent is therefore preferably applied to a pulverulent carrier material or encapsulated by means of a protective colloid, for example polyvinyl alcohol, and used in this form.

Suitable pulverulent carrier materials are known to the person skilled in the art, for example silicon oxides, such as silica gel or silica (for example Sipernat® 22), clays, titanium dioxides, calcium carbonate, synthetic resins, such as silicone resins. The application can be effected by means of known methods: the liquid curing agents can be mixed with the pulverulent carrier, pulverulent particles of carrier coated with curing agent then resulting. Highly viscous curing agents can be mixed with the pulverulent carrier material with shearing, for example in a Retsch mill, in order to obtain pulverulent carriers coated with curing agent.

For the microencapsulation with protective colloid, the curing agents are mixed with an aqueous solution of the protective colloid and the water is then removed, for example by means of drum drying or spray drying.

The amount used of the curing agents crosslinking with the epoxy resin depends on the molar ratio of the epoxide groups to the functional groups of the curing agent, preferably amino groups, in the polymer powder composition. In general, the epoxide-containing powders and the curing agents are used in a ratio such that the molar ratio of epoxide groups to the functional groups of the curing agent is from 0.5 to 2.0.

For the preparation of the base polymer, of the crosslinkable polymer powder composition redispersible in water, suitable vinyl esters are those of carboxylic acids having 1 to 15 C atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of a-branched monocarboxylic acids having 9 to 13 C atoms (vinyl versatates), for example VeoVa9® or VeoVa10® (trade names of Resolution). Vinyl acetate is particularly preferred. Suitable methacrylates or acrylates are esters of straight-chain or branched alcohols having 1 to 15 C atoms, such as methyl acrylate, methyl methacrylate, ethyl acrylate, ethyl methacrylate, propyl acrylate, propyl methacrylate, butyl acrylate (n-, iso- and tert-), n-butyl methacrylate, 2-ethylhexyl acrylate, norbornyl acrylate. Methyl acrylate, methyl methacrylate, butyl acrylate and 2-ethylhexyl acrylate are preferred. Examples of olefins and dienes are ethylene, propylene and 1,3-butadiene. Suitable vinylaromatics are styrene and vinyltoluene. A suitable vinyl halide is vinyl chloride.

If appropriate, from 0.05 to 10% by weight, preferably from 0.05 to <2% by weight, particularly preferably from 0.05 to 1% by weight, based in each case on the total weight of the base polymer, of auxiliary monomers can also be copolymerized. Most preferably, none of the below-mentioned auxiliary monomers, in particular no ethylenically unsaturated mono- or dicarboxylic acids, are copolymerized. What is important is that no epoxide-functional comonomers are copolymerized for the preparation of the base polymer.

Examples of auxiliary monomers are ethylenically unsaturated mono- and dicarboxylic acids, ethylenically unsaturated carboxamides and carbonitriles, mono- and diesters of fumaric acid and maleic acid, and maleic anhydride, ethylenically unsaturated sulfonic acids, such as vinylsulfonic acid, 2-acrylamido-2-methylpropanesulfonic acid. Further examples are precrosslinking comonomers, such as polyethylenically unsaturated comonomers, for example divinyl adipate, diallyl maleate, allyl methacrylate or triallyl cyanurate, or postcrosslinking comonomers, for example acrylamidoglycolic acid (AGA), methyl methacrylamidoglycolate (MAGME), N-methylolacrylamide (NMA), N-methylolmethacrylamide (NMMA), N-methylolallyl carbamate, alkyl ethers, such as the isobutoxy ether, or esters of N-methylolacrylamide, of N-methylolmethacrylamide and of N-methylolallyl carbamate. Further examples are silicon-functional comonomers, such as acryloyloxypropyltri(alkoxy)- and methacryloyloxypropyltri(alkoxy)silanes, vinyltrialkoxysilanes and vinylmethyldialkoxysilanes.

Examples of suitable base polymers, of the crosslinkable polymer powder composition redispersible in water, are polymers which are obtained by means of polymerization of vinyl acetate, copolymerization of vinyl acetate with ethylene, copolymerization of vinyl acetate with ethylene and one or more further vinyl esters, such as vinyl versatate or vinyl laurate, copolymerization of vinyl chloride with ethylene, copolymerization of vinyl chloride and ethylene and one or more vinyl esters, such as vinyl acetate and vinyl laurate, copolymerization of vinyl acetate with ethylene and one or more acrylates, homo- and copolymerization of (meth)acrylates, copolymerization of styrene with one or more acrylates, copolymerization of styrene with 1,3-butadiene, it being possible, if appropriate, for auxiliary monomers also to be copolymerized in each case.

Copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having 1 to 12 C atoms in the carboxyl radical, such as vinyl propionate, vinyl laurate, vinyl esters of alpha-branched carboxylic acids having 9 to 13 C atoms (vinyl versatates), such as VeoVa9®, VeoVa10®, VeoVa11®; copolymers of vinyl acetate, from 1 to 40% by weight of ethylene and preferably from 1 to 60% by weight of (meth)acrylates of straight-chain or branched alcohols having 1 to 15 C atoms, in particular butyl acrylate or 2-ethylhexyl acrylate; and copolymers comprising from 30 to 75% by weight of vinyl acetate, from 1 to 30% by weight of vinyl laurate or vinyl esters of an alpha-branched carboxylic acid having 9 to 13 C atoms, and from 1 to 30% by weight of (meth)acrylates of straight-chain or branched alcohols having 1 to 15 C atoms, in particular methyl methacrylate, butyl acrylate or 2-ethylhexyl acrylate, which also contain from 1 to 40% by weight of ethylene; copolymers comprising vinyl acetate and/or one or more further comonomers from the group consisting of vinyl esters having 1 to 12 C atoms in the carboxyl radical, and from 1 to 40% by weight of ethylene and from 1 to 60% by weight of vinyl chloride are preferred; it also being possible for the polymers to contain said auxiliary monomers in said amounts, and the data in % by weight summing in each case to 100% by weight.

(Meth)acrylate polymers, such as copolymers of butyl acrylate or 2-ethylhexyl acrylate or copolymers of methyl methacrylate with butyl acrylate and/or 2-ethylhexyl acrylate and optionally ethylene; styrene-acrylate copolymers comprising styrene and one or more monomers from the group consisting of methyl acrylate, ethyl acrylate, propyl acrylate, butyl acrylate, 2-ethylhexyl acrylate; vinyl acetate-acrylate copolymers comprising one or more monomers from the group consisting of methyl acrylate, ethyl acrylate, propyl acrylate, butyl acrylate, 2-ethylhexyl acrylate and optionally ethylene; styrene-1,3-butadiene copolymers are also preferred; it also being possible for the polymers to contain said auxiliary monomers in said amounts, and the data in % by weight summing in each case to 100% by weight.

The choice of monomers or the choice of the proportions by weight of the comonomers is effected so that in general a glass transition temperature Tg of from −50° C. to +50° C., preferably from −30° C. to +50° C., results. The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956), the following is true: $1/Tg=x1/Tg1+x2/Tg2+ \ldots +xn/Tgn$, where xn is the mass fraction (% by weight/100) of the monomer n and Tgn is the glass transition temperature in Kelvin of the homopolymer of the monomer n. Tg values for homopolymers are mentioned in Polymer Handbook 2$^{nd}$ Edition, J. Wiley & Sons, New York (1975).

The polymerization for the preparation of the base polymers is effected by the emulsion polymerization process or by the suspension polymerization process, preferably by the emulsion polymerization process, the polymerization temperature being in general from 40° C. to 100° C., preferably from 60° C. to 90° C. In the copolymerization of gaseous comonomers, such as ethylene, 1,3-butadiene or vinyl chloride, it is also possible to work under pressure, in general at from 5 bar to 100 bar.

The polymerization is initiated with the water-soluble or monomer-soluble initiators or redox initiator combinations customary for emulsion polymerization or suspension polymerization. Examples of water-soluble initiators are the sodium, potassium and ammonium salts of peroxodisulfuric acid, hydrogen peroxide, tert-butyl peroxide, tert-butyl hydroperoxide, potassium peroxodiphosphate, tert-butyl peroxopivalate, cumyl hydroperoxide, isopropylbenzyl monohydroperoxide, azobisisobutyronitrile. Examples of monomer-soluble initiators are dicetyl peroxydicarbonate, dicyclohexyl peroxydicarbonate, dibenzoyl peroxide. Said initiators are used in general in an amount of from 0.001 to 0.02% by weight, preferably from 0.001 to 0.01% by weight, based in each case on the total weight of the monomers.

Redox initiators used are combinations of said initiators in combination with reducing agents. Suitable reducing agents are the sulfites and bisulfites of the alkali metals and of ammonium, for example sodium sulfite, the derivatives of sulfoxylic acid, such as zinc or alkali metal formaldehyde sulfoxylates, for example sodium hydroxymethane-sulfinate, and ascorbic acid. The amount of reducing agent is in general from 0.001 to 0.03% by weight, preferably from 0.001 to 0.015% by weight, based in each case on the total weight of the monomers.

For controlling the molecular weight, regulating substances can be used during the polymerization. If regulators are used, they are usually employed in amounts of from 0.01 to 5.0% by weight, based on the monomers to be polymerized and are metered separately or premixed with reaction components. Examples of such substances are n-dodecyl mercaptan, tert-dodecyl mercaptan, mercaptopropionic acid, methyl mercaptopropionate, isopropanol and acetaldehyde.

Suitable protective colloids for the polymerization are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl and hydroxypropyl derivatives thereof, dextrins and cyclodextrins; proteins, such as casein or caseinate, soybean protein, gelatin; ligninsulfonates; synthetic polymers, such as poly(meth)acrylic acid, copolymers of (meth)acrylates with carboxy-functional comonomer units, poly(meth)acrylamide, polyvinylsulfonic acids and the water-soluble copolymers thereof; melamine formaldehyde sulfonates, naphthalene formaldehyde sulfonates, styrene-maleic acid and vinyl ether-maleic acid copolymers; cationic polymers, such as poly-DADMAC (polydiallyldimethylammonium chloride).

Partly hydrolyzed or completely hydrolyzed polyvinyl alcohols having a degree of hydrolysis of from 80 to 100 mol %, in particular partly hydrolyzed polyvinyl alcohols having a degree of hydrolysis of from 80 to 95 mol % and a Höppler viscosity, in 4% strength aqueous solution, of from 1 to 30 mPa·s (Höppler method at 20° C., DIN 53015) are preferred. Partly hydrolyzed polyvinyl alcohols modified to impart hydrophobic properties and having a degree of hydrolysis of from 80 to 95 mol % and a Höppler viscosity, in 4% strength aqueous solution, of from 1 to 30 mPa·s are also preferred. Examples of these are partly hydrolyzed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 to 11 C atoms, dialkyl maleates and dialkyl fumarates, such as diisopropyl maleate and diisopropyl fumarate, vinyl chloride, vinyl alkyl ethers, such as vinyl butyl ether, olefins, such as ethene and decene. The proportion of the hydrophobic units is preferably from 0.1 to 10% by weight, based on the total weight of the partly hydrolyzed polyvinyl alcohol. It is also possible to use mixtures of said polyvinyl alcohols.

Partly hydrolyzed polyvinyl alcohols having a degree of hydrolysis of from 85 to 94 mol % and a Höppler viscosity, in 4% strength aqueous solution, of from 3 to 25 mPa·s (Höppler method at 20° C., DIN 53015) are most preferred. The partly hydrolyzed polyvinyl acetates having vinyl alcohol units and units of vinyl esters of alpha-branched carboxylic acids having 5 or 9 to 11 C atoms in said amounts are also most preferred. Examples of such vinyl esters are those which are offered as vinyl versatate under the designations VeoVa®5, VeoVa®9, VeoVa®10 and VeoVa®11. Further polyvinyl alcohols which are most preferred are partly hydrolyzed, hydrophobized polyvinyl acetates which are obtained by polymer-analogous reaction, for example acetalation of the vinyl alcohol units with $C_1$- to $C_4$-aldehydes, such as butyraldehyde. The proportion of the hydrophobic units is preferably from 0.1 to 10% by weight, based on the total weight of the partly hydrolyzed polyvinyl acetate. The degree of hydrolysis is from 80 to 95 mol %, preferably from 85 to 94 mol %, and the Höppler viscosity (DIN 53015, Höppler method, 4% strength aqueous solution) is from 1 to 30 mPa·s, preferably from 2 to 25 mPa·s. Said protective colloids are obtainable by means of processes known to the person skilled in the art and are generally added in an amount of altogether from 1 to 20% by weight, based on the total weight of the monomers, during the polymerization.

If polymerization is effected in the presence of emulsifiers, the amount thereof is from 1 to 5% by weight, based on the amount of monomers. Preferably, no emulsifiers are used. Suitable emulsifiers are anionic and cationic as well as nonionic emulsifiers, for example anionic surfactants, such as alkylsulfates having a chain length of 8 to 18 C atoms, alkyl or alkylaryl ether sulfates having 8 to 18 C atoms in the hydrophobic radical and up to 40 ethylene oxide or propylene oxide units, alkane- or alkylarylsulfonates having 8 to 18 C atoms, esters and monoesters of sulfosuccinic acid with monohydric alcohols or alkylphenols, or nonionic surfactants, such as alkyl polyglycol ethers or alkylaryl polyglycol ethers having 8 to 40 ethylene oxide units.

The monomers can all be initially introduced for the preparation of the dispersion (batch process) or a part of the monomers is initially introduced and the remainder is metered (semibatch process). The epoxy resin can be initially introduced completely or partly with the preparation water. The epoxy resin can also be initially introduced completely or partly in solution in a monomer. In a further embodiment, the epoxy resin can be metered in completely or partly after the initiation of the polymerization. The epoxy resin, for example dissolved in the monomer, can be dispersed in water or can be metered in as liquid. The epoxy resin can also be added completely or partly, after the end of the polymerization, to the polymer dispersion obtained thereby, i.e. before the drying thereof. The addition before or during the polymerization is preferred, it being possible for the epoxy resin to be initially introduced completely before the polymerization or to be metered in completely during the polymerization or to be partly initially introduced before the polymerization and the remainder to be metered in during the polymerization.

The aqueous dispersions obtainable by the process according to the invention have a solids content of from 30 to 75% by weight, preferably from 45 to 60% by weight.

For the preparation of the polymer powders redispersible in water, the aqueous dispersions, if appropriate after addition of protective colloids as drying aids, are dried, for example by means of fluidized-bed drying, freeze drying or spray drying. Preferably, the dispersions are spray-dried. The spray drying is effected in customary spray drying units, it being possible for the atomization to be effected by means of one-fluid, two-fluid or multifluid nozzles or by a rotating disk. The exit temperature is generally chosen in the range from 45° C. to 120° C., preferably from 60° C. to 90° C., depending on unit, Tg of the resin and desired degree of drying.

As a rule, the drying aid is used in a total amount of from 3 to 30% by weight, based on the polymeric constituents of the dispersion. This means that the total amount of protective colloid before the drying process should be at least 3 to 30% by weight, based on the proportion of polymer; preferably, from 5 to 20% by weight, based on the proportion of polymer, is used.

Suitable drying aids are, for example, partly hydrolyzed polyvinyl alcohols; polyvinylpyrrolidones; polyvinyl acetals; polysaccharides in water-soluble form, such as starches (amylose and amylopectin), celluloses and the carboxymethyl, methyl, hydroxyethyl and hydroxypropyl derivatives thereof; proteins, such as casein or caseinate, soybean protein, gelatin; ligninsulfonates; synthetic polymers, such as poly(meth)acrylic acid, copolymers of (meth)acrylates with carboxy-functional comonomer units, poly(meth)acrylamide, polyvinylsulfonic acids and the water-soluble copolymers thereof; melamine formaldehyde sulfonates, naphthalene formaldehyde sulfonates, styrene-maleic acid and vinyl ether-maleic acid copolymers; cationic polymers, such as poly-DADMAC. Preferably, no further protective colloids in the form of partly hydrolyzed polyvinyl alcohols are used as drying aids.

During the spraying, a content of up to 1.5% by weight of antifoam, based on the base polymer, has proven advantageous in many cases. For increasing the storability by improving the stability to blocking, in particular in the case of powders having a low glass transition temperature, the powder obtained can be provided with an antiblocking agent (anticaking agent), preferably up to 30% by weight, based on the total weight of polymeric constituents. Examples of antiblocking agents are calcium carbonate or magnesium carbonate, talc, gypsum, silica, kaolins, metakaolin, silicates having particle sizes of, preferably, in the range from 10 nm to 10 μm.

The viscosity of the feed to be sprayed is adjusted via the solids content so that a value of <500 mPa·s (Brookfield viscosity at 20 revolutions and 23° C.), preferably <300 mPa·s, is obtained. The solids content of the dispersion to be sprayed is >35%, preferably >40%.

For improving the performance characteristics, further additives may be added during the spraying. Further constituents of dispersion powder compositions which are present in preferred embodiments are, for example, pigments, fillers, foam stabilizers and water repellents.

In order to obtain a pulverulent, crosslinking and redispersible polymer powder composition, a pulverulent curing agent crosslinking with the epoxy resin can be mixed with the dispersion powder after the drying thereof, preferably immediately after the drying. It is also possible to adopt a procedure in which the crosslinkable polymer powder redispersible in water is first mixed with the crosslinking, pulverulent curing agent before the application of said polymer powder, preferably immediately before the application thereof. It is also conceivable for the crosslinkable polymer powder redispersible in water and the pulverulent curing agent to be applied separately from one another. For example, in the preparation of a dry mortar composition, the crosslinkable polymer powder redispersible in water and the pulverulent curing agent can be mixed separately from one another, optionally premixed with further constituents of the formulation.

In the preparation of pasty systems, for example, it is also possible to adopt a procedure in which the crosslinkable polymer powder modified with epoxy resin and redispersible in water is mixed with liquid curing agent before the application, preferably immediately before the application. It is also conceivable for the crosslinkable polymer powder modified with epoxy resin and redispersible in water and the solid or liquid curing agent to be mixed only in the mixing water: for example, the liquid curing agent is added to the mixing water and the crosslinkable polymer powder modified with epoxy resin and redispersible in water and other solid constituents of the formulation are then mixed with this mixing water. Conversely, first the solid constituents, such as the crosslinkable polymer powder modified with epoxy resin and redispersible in water, are dispersed in the mixing water and then the liquid curing agent is added.

The crosslinkable polymer powder composition redispersible in water can be used in the areas of use which are typical therefor, for example in construction chemistry products, optionally in combination with mineral binders such as cements (Portland, high-alumina, trass, slag, magnesia or phosphate cement), gypsum and waterglass, such as construction adhesives, in particular tile adhesives and composite thermal insulation adhesives, renders, filling compounds, floor filling compounds, leveling compounds, slurry-type seal coatings, joint mortars and paints, and furthermore as coating materials or adhesives; or as coating materials or binders for woven and nonwoven textiles and paper.

Preferably, the construction chemistry products are present in the form of their dry mortar. Typical formulations for dry mortar are known to the person skilled in the art. They contain from 0 to 50% by weight, preferably from 0.05 to 50% by weight, of mineral binder, from 5 to 80% by weight of filler, from 0.1 to 10% by weight of polymer powder composition, from 0 to 30% by weight of further additives, based in each case on the total weight of the formulation, the data in percent by weight in the formulation summing to 100% by weight. Suitable mineral binders are cement, gypsum, waterglass or slaked lime. Examples of fillers which can be used are carbonates, such as calcium carbonate, in the form of dolomite, calcite and chalk. Further examples are silicates, such as magnesium silicate in the form of talc, or aluminum silicates, such as loam and clays; quartz powder, quartz sand, finely divided silica, feldspar, barite and ground gypsum pigment. Also suitable are fiber fillers. In practice, mixtures of different fillers are frequently used. Examples of further additives are pigments, for example titanium dioxide as an inorganic pigment, and the customary organic pigments. Examples of further additives are wetting agents in proportions of in general from 0.1 to 0.5% by weight, based on the total weight of the formulation. Examples of these are sodium and potassium polyphosphates, polyacrylic acids and salts thereof. Other additives which may be mentioned are thickeners, which are used in general in an amount of from 0.01 to 2.0% by weight, based on the total weight of the formulation. Customary thickeners are cellulose ethers, starches, or bentonite as an example of an inorganic thickener. Further additives are preservatives, antifoams, air-entraining agents, plasticizers, retardants, accelerators, antifreezes.

For the production of the ready-to-use construction materials, the dry mortar treated with the crosslinkable polymer powder composition redispersible in water is stirred with the required amount of water at the building site.

Use in construction chemistry products which contain only a very small proportion of from 0.05 to 10% by weight, particularly preferably from 0.05 to 3% by weight, of mineral binders, such as cement, is preferred, in the case of these proportions the mineral binder being used predominantly for binding the water during the curing of the mortar and not exclusively for the setting of the building material. Use in construction chemistry products which contain no mineral binders, in particular no cement, is most preferred: for example use in, preferably cement-free and pulverulent, reactive resin joint mortars. The standard formulation for such joint mortars contains in general from 50 to 80% by weight of fillers, such as sand and/or calcium carbonate, and from 20 to 50% by weight of the crosslinkable polymer powder composition redispersible in water, including curing agent, and, if appropriate, said additives.

The crosslinkable polymer powder composition according to the invention which is redispersible in water is distinguished, compared with the prior art, in that, owing to the solid state of aggregation, no premature crosslinking occurs even in the presence of both crosslinking components (epoxide and curing agent) and these mixtures consequently remain stable and storable over a long period. In spite of the crosslinking components in the dispersion powder, the redispersibility is fully retained. After redispersing in water, a rapidly setting crosslinker system which leads to films having high mechanical strength is obtained. In the construction sector, products, for example hardened adhesive mortars and renders, are obtained therewith, which are distinguished by high tensile strength even without the addition of mineral binders. With the crosslinkable polymer powder composition according to the invention which is redispersible in water, products are also obtained which have high surface hardness, for example in hardened joint mortars.

The following examples serve for further illustration of the invention:

Example 1

67 parts by weight of deionized water, 25 parts by weight of a 20% strength by weight aqueous solution of a hydrophobic, partly hydrolyzed polyvinyl alcohol and 25 parts by weight of a 20% strength by weight aqueous solution of a partly hydrolyzed polyvinyl alcohol were initially introduced into a stirred autoclave. The pH was adjusted to pH=4 with 10% strength by weight formic acid. The initially introduced monomer mixture comprising 25 parts by weight of n-butyl acrylate and parts by weight of styrene was metered in with stirring and over a period of 30 min at 30° C. 7 parts by weight of a 1% strength aqueous solution of tert-butyl hydroperoxide and 7 parts by weight of a 1.5% strength by weight aqueous solution of sodium formaldehyde sulfoxylate were metered in over 300 min. When the start of the reaction was detected, the batch was heated to 70° C. in the course of 45 min. 40 min after the beginning of the reaction, a solution of 25 parts by weight of n-butyl acrylate, 25 parts by weight of styrene and 16 parts by weight of epoxy resin (Epilox F 17-00, bisphenol F resin from Leuna Harze) was metered over a period of 150 min. The metering of initiator was continued for a further 120 min after the end of the monomer metering.

100 parts by weight of a 10% strength aqueous solution of a partly hydrolyzed polyvinyl alcohol, 0.2 part by weight of antifoam and 135 parts by weight of water were added to 200 parts by weight of the dispersion (solids content about 50%) and thoroughly mixed. The dispersion was sprayed through a two-fluid nozzle. Air precompressed to 4 bar served as the spraying component and the drops formed were dried by the cocurrent method with air heated to 125° C.

10% by weight of commercially available antiblocking agent (mixture of calcium carbonate and kaolin) was added to the dry powder obtained.

Comparative Example 2

The preparation of the dispersion was effected analogously to Example 1, but without addition of an epoxy resin. All other measures corresponded to Example 1.

Example 3

The preparation of the dispersion was effected analogously to Example 1, but with addition of the epoxy resin before the drying and not during the polymerization.

35 parts by weight of a 20% strength aqueous solution of a partly hydrolyzed polyvinyl alcohol having a Höppler viscosity of 4 mPa·s and a degree of hydrolysis of 88 mol %, 30 parts by weight of an 11% strength aqueous solution of a partly hydrolyzed polyvinyl alcohol having a Höppler viscosity of 13 mPa·s and a degree of hydrolysis of 88 mol %, 0.2 part by weight of antifoam, 16 parts by weight of epoxy resin (Epilox F 17-00) and 135 parts by weight of water were added to 200 parts by weight of the dispersion and thoroughly mixed. The dispersion was sprayed through a two-fluid nozzle. Air precompressed to 4 bar served as a spraying component and the drops formed were dried by the cocurrent method with air heated to 125° C. 12% by weight of commercially available antiblocking agent (mixture of calcium carbonate and kaolin) was added to the dry powder obtained.

Example 4

The preparation of the dispersion was effected analogously to Example 1, except that 16 parts by weight of epoxy resin (Epilox F 17-00, bisphenol F resin from Leuna Harze) were additionally added to the dispersion before the drying of the dispersion.

Testing of the Polymer Powders:
Determination of the Settling Behavior of the Powders (Tube Settling):

For determining the settling behavior, in each case 50 g of the dispersion powder were redispersed in 50 ml of water and then diluted to 0.5% solids content and the settling height of solid from 100 ml of this redispersion introduced into a graduated tube and the settling after 1 hour and 24 hours were measured.

Determination of the Blocking Resistance:

For determining the blocking resistance, the dispersion powder was introduced into an iron tube having a screw cap and then loaded with a metal stamp. After loading, storage was effected in a drying oven for 16 hours at 50° C. After cooling to room temperature, the powder was removed from the tube and the stability to blocking was determined qualitatively by crushing the powder. The stability to blocking was classified as follows:

1=very good stability to blocking; 2=good stability to blocking
3=satisfactory stability to blocking;
4=not stable to blocking, powder is no longer flowable after crushing.

TABLE 1

| Example | Tube settling 1 h/24 h [mm] | Resistance to blocking |
|---|---|---|
| Example 1 | 0.2/0.6 | 2 |
| C. Example 2 | 0.2/0.5 | 2 |
| Example 3 | 0.3/0.7 | 2 |
| Example 4 | 0.4/0.8 | 2 |

The results in Table 1 show that the crosslinkable dispersion powders according to the invention have outstanding redispersibility which does not differ from conventional dispersion powders (Comparative Example 2 without epoxy resin).

Testing of Performance Characteristics:

For determining the film strength, a 50% strength redispersion of the powder from Example 1 was prepared and was mixed with the stated curing agents in the stated molar mixing ratio. The dried films were tested in a tensile test according to DIN 53504. The crosslinked films were intact after storage in water for 7 days, whereas the uncrosslinked film had been redispersed. The results are summarized in Table 2. The results show that the films effectively crosslink. This shows that the crosslinkable polymer powder composition modified with epoxy resin redisperses very readily in spite of the proportion of epoxy resin. Furthermore, it is shown thereby that the epoxide functions are freely accessible for the amine crosslinking agent and are not deactivated, for example by inclusion in a polymer matrix.

The dispersion powders from Examples 3 and 4 were tested analogously. The results are summarized in Tables 4 and 5.

With the compositions stated in Table 4 (Example 3), a 50% strength redispersion of the powder was then also prepared and was mixed with said curing agents in said molar mixing ratio. The dried films were then stored for three days in water and only thereafter tested in a tensile test according to DIN 53504. The reference film without curing agent had become redispersed after this time and could no longer be tested. The film based on the mixture having an epoxide/amine molar ratio=0.8 showed, when measured in the wet state, a tensile strength of 9.7 MPa and the film based on the mixture having an epoxide/amine molar ratio=1.2 showed, when measured in the wet state, a tensile strength of 5.1 MPa.

In a further test series, systems filled with sand were tested. The powder from Example 1 was mixed with sand (BCS 413, mean particle size 130 μm) in a weight ratio of 1:2, mixed with said curing agents in said molar mixing ratio and redispersed. The dried films were tested in a tensile test according to DIN 53504. These films, too, were intact after storage in water for 7 days whereas the uncrosslinked film had become redispersed. The results are summarized in Table 3.

TABLE 2

| (Example 1): | | |
|---|---|---|
| Curing agent | Epoxide/amine molar ratio | Tensile strength [MPa] |
| Anquamine 401 | 0.8 | 12.3 |
|  | 1.2 | 12.2 |
|  | 1.5 | 10.9 |
| Epilink 701 | 0.8 | 10.4 |
|  | 1.2 | 10.3 |
|  | 1.5 | 10.9 |
| Jeffamine EDR-104 | 0.8 | 9.7 |
|  | 1.2 | 12.9 |
| Jeffamine EDR-176 | 0.8 | 11.6 |
|  | 1.2 | 12.8 |

TABLE 2-continued (Example 1):

| Curing agent | Epoxide/amine molar ratio | Tensile strength [MPa] |
|---|---|---|
| Epilox H10-32 | 0.8 | 11.9 |
| | 1.2 | 11.4 |
| Polyimin P | 0.8 | 9.6 |
| | 1.2 | 8.8 |
| Geniosil GF 91 | 0.8 | 11.5 |
| | 1.2 | 10.0 |
| Geniosil GF 93 | 0.8 | 9.9 |
| | 1.2 | 7.7 |
| Geniosil GF 95 | 0.8 | 16.5 |
| | 1.2 | 15.9 |
| Reference | without curing agent | 7.1 |

TABLE 3

(Example 1):

| Curing agent | Epoxide/amine mixing ratio | Tensile strength [MPa] |
|---|---|---|
| Anquamine 401 | 1.2 | 1.4 |
| Geniosil GF 95 | 1.2 | 7.2 |
| Anquamine 401 from Sipernat 22 | 1.2 | 2.1 |
| Geniosil GF 91 from Sipernat 22 | 1.2 | 4.6 |
| Reference | without curing agent | 0.8 |

TABLE 4

(Example 3):

| Curing agent | Epoxide/amine molar ratio | Tensile strength [MPa] |
|---|---|---|
| Epilink 701 | 0.8 | 10.3 |
| | 1.2 | 9.7 |
| Reference | without curing agent | 7.1 |

TABLE 5

(Example 4):

| Curing agent | Epoxide/amine molar ratio | Tensile strength [MPa] |
|---|---|---|
| Epilink 701 | 0.8 | 15.7 |
| | 1.2 | 13.3 |
| Reference | without curing agent | 5.6 |

The invention claimed is:

1. A crosslinkable polymer powder composition comprising a polymer powder, obtained by
  a) free radical polymerization, in an aqueous medium, of one or more monomers selected from the group consisting of vinyl esters of straight-chain or branched alkylcarboxylic acids having 1 to 15 C atoms, methacrylates and acrylates of alcohols having 1 to 15 C atoms, vinylaromatics, olefins, and dienes, no epoxide-functional comonomers being copolymerized, and
  b) subsequent spray drying of the polymer dispersion obtained thereby in the presence of a protective colloid as drying aid to form the polymer powder, wherein an epoxy resin is added before and/or during the polymerization and/or before the drying of the polymer dispersion, wherein the composition is redispersible in water;
  wherein the protective colloid is selected from the group consisting of polyvinyl alcohols; polyvinyl acetals; polyvinylpyrrolidones; polysaccharides in water-soluble form; celluloses and carboxymethyl, methyl, hydroxyethyl and hydroxypropyl derivatives thereof; dextrins; cyclodextrins; proteins; ligninsulfonates; poly(meth)acrylic acid; copolymers of (meth)acrylates with carboxy-functional comonomer units; poly(meth)acrylamide; polyvinylsulfonic acids and water-soluble copolymers thereof; melamine formaldehyde sulfonates; naphthalene formaldehyde sulfonates; styrene-maleic acid copolymers; vinyl ether-maleic acid copolymers and cationic polymers.

2. The crosslinkable polymer powder composition as claimed in claim 1, wherein the one or more monomers comprise vinyl acetate.

3. A process for the preparation of a crosslinkable polymer powder composition as claimed in claim 1, comprising free radical emulsion polymerization or suspension polymerization in an aqueous medium of one or more monomers from the group consisting of vinyl esters of straight-chain or branched alkylcarboxylic acids having 1 to 15 C atoms, methacrylates and acrylates of alcohols having 1 to 15 C atoms, vinylaromatics, olefins, dienes and vinyl halides, no epoxide-functional comonomers being copolymerized, and subsequent spray drying of the polymer dispersion obtained thereby in the presence of a protective colloid as drying aid, wherein, before and/or during the polymerization and/or before the drying of the polymer dispersion obtained thereby, an epoxy resin is added.

4. The process for the preparation of the crosslinkable polymer powder composition as claimed in claim 3, wherein the epoxy resin is added before and/or during the polymerization.

5. A construction chemistry product comprising the crosslinkable polymer powder composition as claimed in claim 1.

6. A binder for a coating material or adhesive, comprising the crosslinkable polymer powder composition as claimed in claim 1.

7. A construction chemistry product as claimed in claim 5, wherein the construction chemistry product is selected from the group consisting of construction adhesives, renders, filling compounds, floor filling compounds, leveling compounds, slurry-type seal coatings, joint mortars and paints.

8. A dry mortar composition comprising the crosslinkable polymer powder composition as claimed in claim 1.

9. The construction chemistry product as claimed in claim 5, wherein from 0.05 to 10% by weight of mineral binders are present.

10. The construction chemistry product as claimed in claim 5, wherein no mineral binders are present.

11. The construction chemistry product of claim 9, wherein the product is a reactive resin joint mortar.

12. A method of making a construction chemistry product as claimed in claim 5, wherein the product is a dry composition, wherein the crosslinkable polymer powder composition comprises a pulverulent curing agent that is mixed separately from the polymer powder.

13. A method of making a construction chemistry product as claimed in claim 5, wherein the product is a pasty composition, wherein the crosslinkable polymer powder composition comprises a liquid curing agent mixed with the polymer powder prior to application, or the polymer powder and the curing agent are mixed only in mixing water.

14. The crosslinkable polymer powder composition as claimed in claim 2, wherein the one or more monomers further comprise ethylene.

15. The crosslinkable polymer powder composition as claimed in claim 14, wherein the one or more monomers further comprise one or more additional vinyl esters.

16. The crosslinkable polymer powder composition as claimed in claim 15, wherein the one or more additional vinyl esters comprise vinyl versatate and/or vinyl laurate.

17. The crosslinkable polymer powder composition as claimed in claim 14, wherein the one or more monomers further comprise one or more acrylates.

18. The crosslinkable polymer powder composition as claimed in claim 1, wherein the one or more monomers further comprise one or more vinyl esters.

19. The crosslinkable polymer powder composition as claimed in claim 18, wherein the one or more vinyl esters comprise vinyl acetate and/or vinyl laurate.

20. The crosslinkable polymer powder composition as claimed in claim 1, wherein the one or more monomers comprise one or more (meth)acrylates.

21. The crosslinkable polymer powder composition as claimed in claim 1, wherein the one or more monomers comprise styrene and one or more acrylates.

22. The crosslinkable polymer powder composition as claimed in claim 1, wherein the one or more monomers comprise styrene and 1,3-butadiene.

23. A coating material or binder for paper or a woven or nonwoven textile, comprising the crosslinkable polymer powder composition as claimed in claim 1.

24. The construction chemistry product of claim 10, wherein the product is a reactive resin joint mortar.

25. A method of making a binder for a coating material or adhesive as claimed in claim 6, wherein the product is a dry composition, wherein the crosslinkable polymer powder composition comprises a pulverulent curing agent that is mixed separately from the polymer powder.

26. A method of making a coating material or binder for paper or a woven or nonwoven textile as claimed in claim 23, wherein the product is a dry composition, wherein the crosslinkable polymer powder composition comprises a pulverulent curing agent that is mixed separately from the polymer powder.

27. A method of making a binder for a coating material or adhesive as claimed in claim 6, wherein the product is a pasty composition, wherein the crosslinkable polymer powder composition comprises a liquid curing agent mixed with the polymer powder prior to application, or the polymer powder and the curing agent are mixed only in mixing water.

28. A method of making a coating material or binder for paper or a woven or nonwoven textile as claimed in claim 23, wherein the product is a pasty composition, wherein the crosslinkable polymer powder composition comprises a liquid curing agent mixed with the polymer powder prior to application, or the polymer powder and the curing agent are mixed only in mixing water.

29. The crosslinkable polymer powder composition as claimed in claim 1, wherein the free radical polymerization is an emulsion polymerization carried out in the presence of a protective colloid.

30. The crosslinkable polymer powder composition as claimed in claim 1, wherein the protective colloid is a polyvinyl alcohol.

31. The crosslinkable polymer powder composition as claimed in claim 1, wherein the protective colloid is a partly hydrolyzed polyvinyl alcohol having a degree of hydrolysis of from 85 to 94 mol % and a Höppler viscosity, in 4% strength aqueous solution, of from 3 to 25 mPa·s at 20° C.

* * * * *